(12) United States Patent
Dhuness et al.

(10) Patent No.: US 9,438,455 B2
(45) Date of Patent: Sep. 6, 2016

(54) MODULATION OF SIGNALS

(75) Inventors: Kahesh Dhuness, Pretoria (ZA);
Bodhaswar Tikanath Jugpershad Maharaj, Pretoria (ZA)

(73) Assignee: University of Pretoria (ZA)

( * ) Notice: Subject to any disclaimer, the term of this patent is extended or adjusted under 35 U.S.C. 154(b) by 742 days.

(21) Appl. No.: 13/697,442

(22) PCT Filed: May 11, 2011

(86) PCT No.: PCT/IB2011/052066
§ 371 (c)(1),
(2), (4) Date: Jun. 12, 2013

(87) PCT Pub. No.: WO2011/141879
PCT Pub. Date: Nov. 17, 2011

(65) Prior Publication Data
US 2015/0319022 A1 Nov. 5, 2015

(30) Foreign Application Priority Data
May 12, 2010 (ZA) .................................. 2010/03368

(51) Int. Cl.
*H03C 3/00* (2006.01)
*H04L 27/18* (2006.01)
*H04L 5/00* (2006.01)
*H04L 27/26* (2006.01)

(52) U.S. Cl.
CPC .............. *H04L 27/18* (2013.01); *H04L 5/0007* (2013.01); *H04L 27/2614* (2013.01); *H04L 27/2628* (2013.01); *H04L 27/2634* (2013.01); *H04L 27/2649* (2013.01)

(58) Field of Classification Search
CPC .......... H04L 27/2614; H04L 27/2626; H04L 27/3411; H04L 27/2623; H04L 27/2624; H04B 2201/70706; Y02B 60/50
USPC ......................... 375/302, 146, 295, 308, 271
See application file for complete search history.

(56) References Cited

U.S. PATENT DOCUMENTS

| | | | |
|---|---|---|---|
| 2002/0181404 A1 | 12/2002 | Insler et al. | |
| 2005/0213691 A1* | 9/2005 | Ozluturk | H04L 27/22 375/343 |
| 2006/0029143 A1 | 2/2006 | Yoshida | |
| 2009/0279418 A1 | 11/2009 | Scarpa et al. | |
| 2010/0080309 A1 | 4/2010 | Moffatt et al. | |
| 2010/0080311 A1* | 4/2010 | Moffatt | H04L 25/022 375/260 |

OTHER PUBLICATIONS

International Search Report and Written Opinion from related application PCT/IS11/52066, mailed Jan. 17, 2012.
International Preliminary Report on Patentability from related application PCT/IS11/52066, dated Jun. 22, 2012.

* cited by examiner

*Primary Examiner* — Leila Malek
(74) *Attorney, Agent, or Firm* — Grossman Tucker Perreault & Pfleger PLLC

(57) ABSTRACT

An orthogonal frequency division multiplexing (OFDM) modulation method, which includes phase modulating both the real and imaginary components of an OFDM signal.

14 Claims, 2 Drawing Sheets

MODULATION OF SIGNALS

CROSS REFERENCE TO RELATED APPLICATIONS

This application claims priority to International PCT Application No. PCT/IB2011/052066 filed May 11, 2011, which claims priority to South African Application No. 2010/03368 filed May 12, 2010, the entire content of each of which are fully incorporated herein by reference.

This invention relates to modulation of signals. In particular, the invention relates to an OFDM modulation method, to a method of controlling the peak-to-average power ratio of an OFDM modulated signal, to a method of demodulating a method OFDM signal, to an OFDM modulator, to an OFDM demodulator and to an OFDM communication arrangement.

BACKGROUND OF THE INVENTION

The inventors are aware of an OFDM signal schemes. However, a major disadvantage of an OFDM signal, is it's high peak-to-average power ratio (PAPR). Various methods have been suggested to reduce the PAPR, which includes clipping, coding, non-linear companding transforms, partial transmitted sequence, selective mapping, active constellation extension, tone reservation and constant envelope phase modulation. The inventors sought a method which requires low implementation complexity, which does not require any additional bandwidth expansion and which does not require side information to reconstruct the original message signal. Furthermore, the method should not lead to a severe bit error rate degradation as the number of carriers increase. The present invention aims to address these requirements and is descriptively referred to as offset modulation of an orthogonal frequency division multiplexing (OM-OFDM) signal.

SUMMARY OF THE INVENTION

According to one aspect of the invention, there is provided an OFDM modulation method, which includes
phase modulating the real and imaginary components of an OFDM signal independently.

The method may include the prior step of independently scaling the real and imaginary components of the OFDM signal.

The scaling of the real and imaginary components of the OFDM signal may be given by:

$$\Phi_1(t) = \frac{\Re(m(t))}{\varsigma}$$

and $$\Phi_2(t) = \frac{\Im(m(t))}{\varsigma}$$

where $\Re$ and $\Im$ respectively refer to the real and imaginary components of the OFDM message signal, $\varsigma$ refers to a constant division term and where $\Phi_1(t)$ and $\Phi_2(t)$ represent the scaled real and imaginary OFDM components. These $\Phi_1(t)$ and $\Phi_2(t)$ are interchangeable.

The method may include the prior step of obtaining an inverse Fourier transform (IFT) of the OFDM message signal.

The IFT may be an N-point inverse Fourier transform given by:

$$m(t) = \frac{1}{\sqrt{N}} \sum_{k=0}^{N-1} X_k e^{j\frac{2\pi t k}{T_s}}, 0 \le t < T_s$$

where $T_s$ is the symbol duration and $X_k$ represents the complex signal written as $a_k + jb_k$.

The method may include the step of adding an offset term to the scaled real component of the OFDM signal.

The method may include the further step of subtracting the phase modulated OFDM scaled imaginary component from the phase modulated OFDM scaled real component.

The phase modulated addition of an offset term to the scaled real portion of the OFDM signal and the subtraction of the phase modulated OFDM scaled imaginary component can be referred to as offset modulation of an orthogonal frequency division multiplexing (OM-OFDM) signal and given by:

$$\cos(2\pi f_c t + \Phi_1(t) + \Psi_{os}) - \cos(2\pi f_c t + \Phi_2(t))$$

where $f_c$ is the carrier frequency, $\Phi_1(t)$ and $\Phi_2(t)$ represent the scaled real and imaginary OFDM components and $\Psi_{os}$ represent the offset term.

The offset term $\Psi_{os}$ may be chosen such that $\Psi_{os}$ is sufficiently large and $\Phi_1(t)$ and $\Phi_2(t)$ are sufficiently small. Typically, $\Psi_{os}$ may be approximately twenty two times larger than $\Phi_1(t)$ and $\Phi_2(t)$. The combination of $\Phi_{os}$ and $\varsigma$ terms ensure that the receiver can successfully detect the original signal.

The method may include the further step of adding or subtracting a dominant frequency component to the modulated OFDM signal.

The dominant frequency component may be given by:

$$\gamma 2 J_0(\beta)^2 \sin\left(2\pi f_c t - \frac{\psi_{os}}{2}\right), 0 \le \gamma < 1$$

where $\gamma$ is a dominant frequency component control factor, $\beta$ is the adapted phase deviation of the real and imaginary OFDM signal and $J_0(\beta)$ is a Bessel function of the first kind of order 0 and argument $\beta$. The adapted phase deviation ($\beta$) may be determining by averaging the real and imaginary deviation of an OFDM signal, which can be represented by $\alpha_1$ and $\alpha_2$, respectively.

Thereafter these real and imaginary OFDM deviations are scaled and referred to as the adapted phase deviation of the real and imaginary signal OFDM signal ($\beta$), this process can be represented as follows, where E[.], is the expected value $$\alpha_1 \approx E[\max(|\Re(m(t))|)]$$
$$\alpha_2 \approx E[\max(|\Im(m(t))|)]$$
$$\beta_1 \approx \frac{\alpha_1}{\varsigma}$$
$$\beta_2 \approx \frac{\alpha_2}{\varsigma}.$$

According to another aspect of the invention, there is provided a method of controlling the PAPR of an OFDM signal in accordance with the method as described above, which further includes an OFDM modulator, which subtracts the dominant frequency component from the modulated OFDM signal; and an OFDM demodulator, which reinstates the dominant frequency component, in order to demodulate the phase modulated signal.

The method may include, an OFDM modulator adjusting the dominant frequency component control factor $$\left(\gamma 2 J_0(\beta)^2 \sin\left(2\pi f_c t - \frac{\psi_{os}}{2}\right), 0 \leq \gamma < 1\right).$$

The method may further include, an OFDM demodulator detecting the dominant frequency component control factor by examining the PAPR of the incoming signal, from which the $\Psi_{os}$, $\zeta$ and $\gamma$ terms can be extracted by using a look-up table.

According to another aspect of the invention, there is provided a method of demodulating an OFDM signal, which includes detecting a PAPR of an OFDM modulated signal;
determining a dominant frequency component control factor ($\gamma$), offset term ($\Psi_{os}$) and a constant division term ($\zeta$) of the OFDM modulated signal by examining the peak-to-average power ratio of the OFDM modulated signal;
reintroducing the dominant frequency into the OFDM modulated signal;
reconstructing the real and imaginary components of the OFDM signal; and
adding the real and imaginary components of the OFDM signal.

The method may include the further step of demodulating the OFDM modulated signal, by removing the high frequency components in order to obtain the difference between the scaled real OFDM, offset term and the scaled imaginary OFDM components, which can be given by $$-\Phi_2+\Phi_1+\Psi_{os}.$$

The method may include the further step of demodulating the incoming OFDM modulated signal, by multiplying it by a scaled phase modulated sinusoidal. Where the phase of the sinusoid is the scaled difference between the scaled imaginary OFDM components, the scaled real OFDM and offset term. This multiplication factor can be given by $$2\sin\left(\frac{\Phi_2(t) - \Phi_1(t) - \Psi_{os}}{2}\right).$$

The method may include the further step of demodulating the incoming OFDM signal, by removing the high frequency components in order to obtain the summation of the scaled real OFDM, offset term and the scaled imaginary OFDM components, which can be given by $$\Phi_1+\Psi_{os}+\Phi_2.$$

The method may include the further step of demodulating the incoming OFDM modulated signal in order to obtain the real and imaginary OFDM components.

The method may include the further step of obtaining a fast Fourier transform (FFT) of the OFDM signal.

The method may include the further step of passing the signal through an equalizer.

According to another aspect of the invention, there is provided an OFDM modulator, which, when operated, executes an OFDM modulation method as described above.

An OFDM modulator, which includes a scaling unit for scaling the imaginary and real components of the transformed input signal;

an offset term addition unit, for adding an offset term to the scaled real portion of the input message;
a phase modulator for modulating the scaled real and imaginary components of the input message;
a subtraction unit for subtracting the phase modulated OFDM imaginary component from the phase modulated OFDM real component; and
a subtraction unit operable to subtract a predefined dominant frequency from the signal.

According to another aspect of the invention, there is provided an OFDM demodulator which, when operated, executes a method of demodulating a modulated OFDM signal as described above.

According to another aspect of the invention, there is provided an OFDM demodulator, which includes a PAPR detection unit for determining the PAPR of an input signal;
a lookup table referencing the PAPR against predefined values for a dominant frequency component control factor ($\gamma$), an offset term ($\Psi_{os}$), and a constant division term ($\zeta$);
a processor for determining the dominant frequency component from the values in the lookup table;
an addition unit operable to add a predefined dominant frequency to the signal; and
an OFDM demodulator for demodulating a modulated signal.

According to another aspect of the invention, there is provided a communication arrangement, which includes any one or both of a modulator as described above and a demodulator as described above.

The invention will now be described, by way of example only with reference to the following drawing(s):

DRAWING(S)

In the drawing(s):

EMBODIMENT OF THE INVENTION

Figure 1:
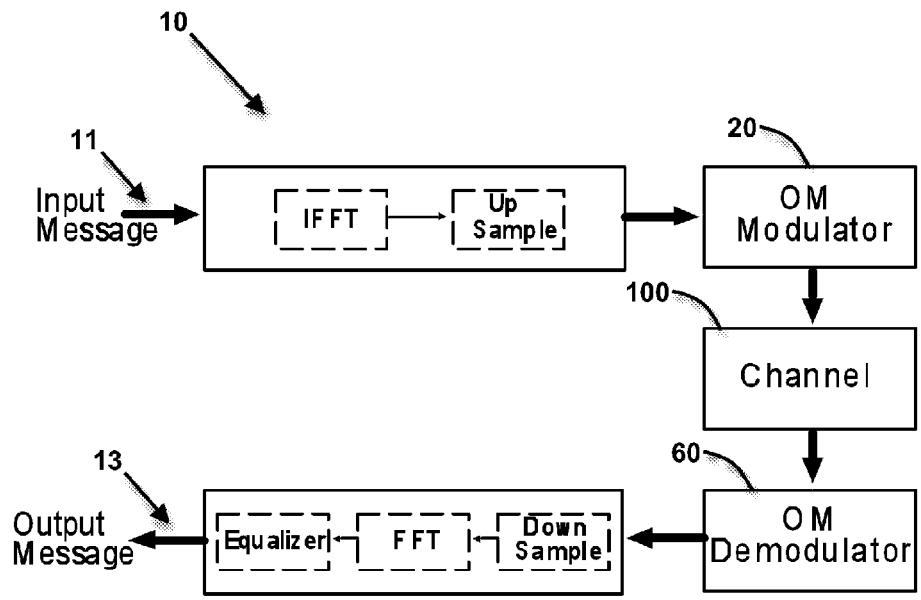
FIG. 1 shows a schematic block diagram of a communication arrangement in accordance with one aspect of the invention.

In FIG. 1 reference numeral 10 refers to a communication arrangement, which includes an offset modulation orthogonal frequency division multiplexing (OM-OFDM) modulator 20, an offset modulation orthogonal frequency division multiplexing (OM-OFDM) demodulator 60 and a communication channel 100.

The modulator receives an input message signal 11 at a transmitter end, this signal is modulated and after passing this modulated signal via the communication channel 100, this signal is feed into the OM demodulator which provides a reconstructed output message signal 13 at a receiver end.

Figure 2:
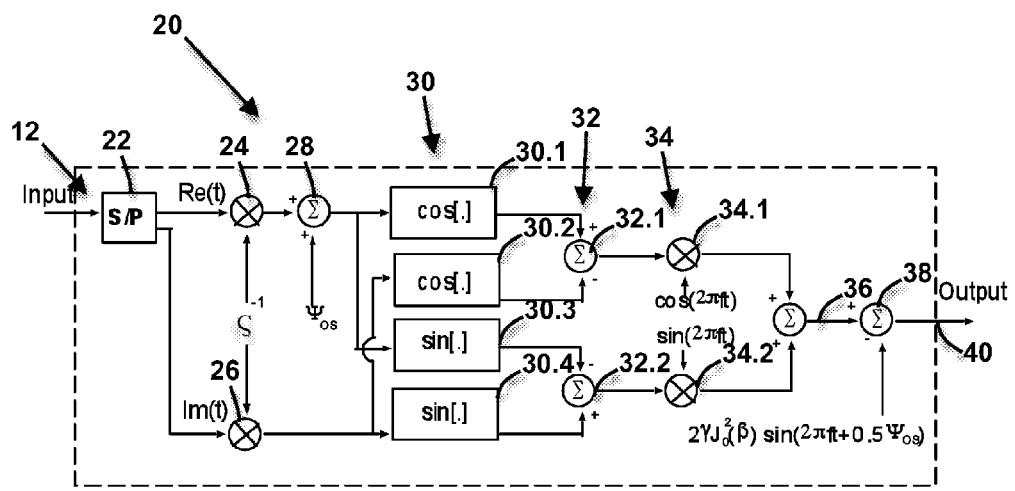
FIG. 2 shows an OM-OFDM modulator in accordance with another aspect of the invention.

The OM-OFDM modulator 20 is shown in more detail in FIG. 2. At 12 the input signal is an N-Point inverse fast Fourier transform (IFFT). The IFFT is given by:

$$m(t) = \frac{1}{\sqrt{N}} \sum_{k=0}^{N-1} X_k e^{j\frac{2\pi t k}{T_s}}, \ 0 \le t < T_s$$

which can be considered to be an OFDM signal, where $T_s$ is the symbol duration and $X_k$ represents the complex signal, which may also be written as $a_k + jb_k$. This signal may be modulated using the method described below.

At 22, by using a serial to parallel (S/P) converter, the incoming signal is separated into it's real and imaginary components.

The output of 22 produces real and imaginary components of the signal, which are then both scaled at 24 and 26 respectively, by dividing them with a constant scaling factor $\zeta$ represented by:

$$\Phi_1(t) = \frac{\Re(m(t))}{\zeta}$$

$$\Phi_2(t) = \frac{\Im(m(t))}{\zeta}$$

where $\Re$ and $\Im$ refer to the real and imaginary parts of the OFDM message signal, $\zeta$ refers to a constant division term, whereas $\Phi_1(t)$ and $\Phi_2(t)$ represent the equivalent scaled real and imaginary OFDM mapping. These $\Phi_1(t)$ and $\Phi_2(t)$ components are interchangeable.

At 28 a constant term $\Psi_{OS}$ is added to the real component of the signal.

At 30 (30.1, 30.2, 30.3, 30.4), the adapted real and imaginary components are phase modulated. The difference between the respective phase modulated signals is taken at 32 (32.1, 32.2).

At 34 (34.1, 34.2) the baseband phase modulated signal is moved to a carrier frequency.

At 36 the resultant consinusoidal with the constant term $\Psi_{OS}$ is given by:

$$\cos(2\pi f_c t + \Phi_1(t) + \Psi_{OS}) - \cos(2\pi f_c t + \Phi_2(t)).$$

or represented as:

$$2\sin\left(\frac{\Phi_2(t) - \Phi_1(t) - \Psi_{OS}}{2}\right)\sin\left(2\pi f_c t \frac{\Phi_1(t) + \Psi_{OS} + \Phi_2(t)}{2}\right)$$

where $\Psi_{OS}$ refers to the offset term. The parameters ($\Psi_{OS}, \zeta$) are chosen such that $\Psi_{OS} >> \Phi_2(t) - \Phi_1(t)$, when $\Psi_{OS}$ is sufficiently large and $\Phi_2(t), \Phi_1(t)$ are sufficiently small. In this instance the $\Psi_{OS}$ term will dominate the expression.

At 38 the dominant frequency control factor given by, $$2J_0(\beta)^2 \sin\left(2\pi f_c t - \frac{\Psi_{OS}}{2}\right)$$

is subtracted from the combined signal before the signal is transmitted at 40 across the communication channel 100.

Figure 3:
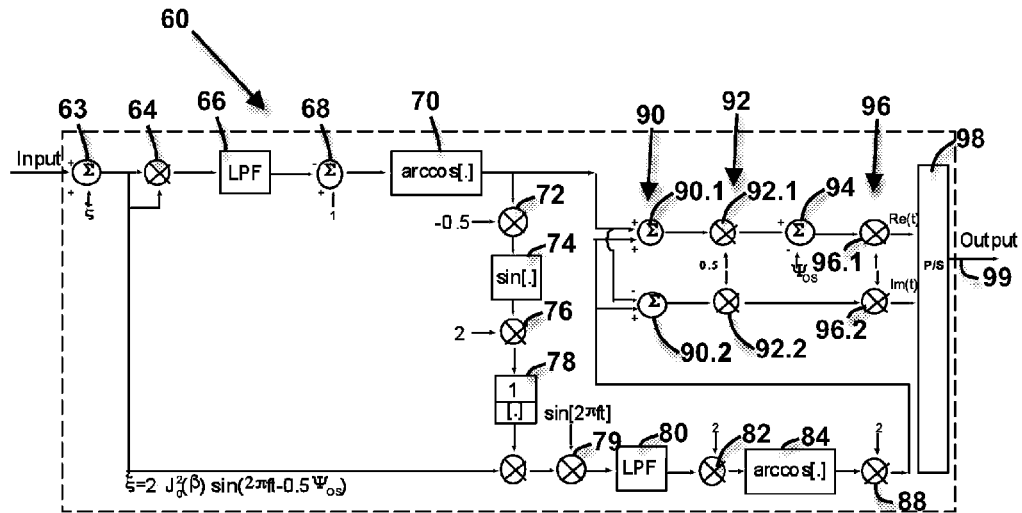
FIG. 3 shows an OM-OFDM demodulator in accordance with another aspect of the invention.

In FIG. 3, the demodulator 60 receives the signal from the communication channel 100.

The dominant frequency $$2J_0(\beta)^2 \sin\left(2\pi f_c t - \frac{\Psi_{OS}}{2}\right)$$

is reinstated at 63.

At 64 the received signal is squared producing a series of baseband and high frequency components which can be expressed as $$1 - \cos(4\pi f_c t + \Phi_1 + \Psi_{os} + \Phi_2) - \cos(-\Phi_2 + \Phi_1 + \Psi_{os}) + \tfrac{1}{2}\cos(2\Phi_2 + 4\pi f_c t) + \tfrac{1}{2}\cos(4\pi f_c t + 2\Phi_1 + 2\Psi_{os}).$$

At 66 the high frequency components of the squared signal are removed by using a low pass filter (LPF), the resultant signal can be given by $$1 - \cos(-\Phi_2 + \Phi_1 + \Psi_{os}).$$

At 68 a constant term is added to the baseband signal, which can be given by $$\cos(-\Phi_2 + \Phi_1 + \Psi_{os}).$$

At 70 the inverse cosinousoidal process is performed producing $$-\Phi_2 + \Phi_1 + \Psi_{os}.$$

At 72 an additional constant multiplication term is introduced resulting in $$\frac{\Phi_2(t) - \Phi_1(t) - \Psi_{OS}}{2}.$$

At 74 the signal is phase modulated by a sinusoid resulting in $$\sin\left(\frac{\Phi_2(t) - \Phi_1(t) - \Psi_{OS}}{2}\right).$$

At 76 the signal is multiplied by a constant multiplication factor resulting in $$2\sin\left(\frac{\Phi_2(t) - \Phi_1(t) - \Psi_{OS}}{2}\right).$$

At 78 the signal is transformed by a division process this results in $$\frac{1}{2\sin\left(\frac{\Phi_2(t) - \Phi_1(t) - \Psi_{OS}}{2}\right)}.$$

At 79 the received input signal is multiplied by a sinusoidal carrier in addition to the term at 78, this results in $$\sin\left(2\pi f_c t + \frac{\Phi_1(t) + \Psi_{OS} + \Phi_2(t)}{2}\right)\sin 2\pi f_c t$$

At 80 the high frequency components are removed by using a low pass filter this results in a baseband signal represented by $$\frac{1}{2}\cos\left(\frac{\Phi_1 + \Psi_{OS} + \Phi_2}{2}\right).$$

At 82 a multiplication factor is introduced, this results in $$\cos\left(\frac{\Phi_1 + \Psi_{OS} + \Phi_2}{2}\right).$$

At 84 an inverse co-sinusoidal operation is performed this results in $$\frac{\Phi_1 + \Psi_{OS} + \Phi_2}{2}.$$

At 88 a multiplication factor is introduced this results in $$\Phi_1 + \Psi_{os} + \Phi_2.$$

The subsequent steps at 90 (90.1, 90.2), 92 (92.1, 92.2), 94 and 96 (96.1, 96.2) are used to isolate the real and imaginary OFDM components. The parallel to serial convertor (P/S) at 99 combine these real and imaginary OFDM components.

The most prominent advantage of OM-OFDM is that by controlling the dominant frequency, the PAPR of the signal can be controlled. Without prior knowledge of the dominant frequency at the OM-OFDM demodulator, the dominant frequency can be determined by means of a look-up table which maps the PAPR of the signal against the other parameters. Therefore the dominant frequency can be determined without additional signal information. As an example the lookup table for a 16 quadrature amplitude modulation scheme is as follows:

| PAPR | $\Psi_{OS}$ | $\zeta$ | $\gamma$ |
|---|---|---|---|
| 7 dB | 1.5 | 10000/4096 | 0.963 |
| 8 dB | 1.5 | 10000/4096 | 0.973 |
| 9 dB | 1.5 | 10000/4096 | 0.98 |
| 10 dB | 1.5 | 10000/4096 | 0.985 |
| 11 dB | 1.5 | 10000/4096 | 0.988 |
| 12 dB | 1.5 | 10000/4096 | 1 |

At 63 to 99 the signal is demodulated with a uniquely developed OM-OFDM demodulation scheme and at 96 (96.1, 96.2) the OFDM real and imaginary components are combined and presented at 99.

Figure 4:
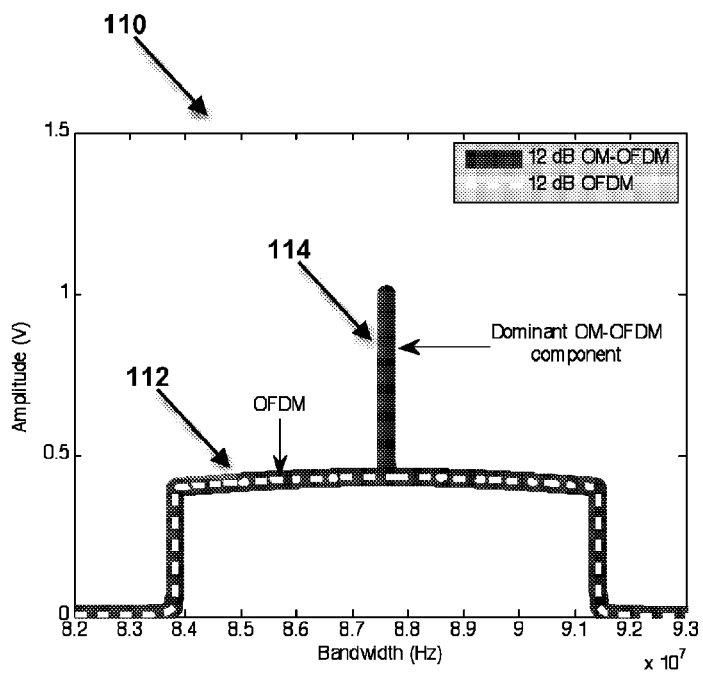
FIG. 4 shows the bandwidth occupancy of the communication arrangement of FIG. 1, when in use.

In FIG. 4, the bandwidth occupancy of the OM-OFDM signal is shown, as a spectrally efficient signal 112 with a dominant frequency component at 114. The dominant frequency component 114 is subtracted in the OM-OFDM modulator and reinstated in the OM-OFDM demodulator.

The inventors found that the OM-OFDM modulation method provides a spectrally efficient signal in which the PAPR can be adjusted without removing information from the signal and which does not lead to a severe bit error degradation. Furthermore, as the PAPR is used to determine the dominant frequency, no side information needs to be transmitted.

The inventors are of the opinion that the invention provides substantial advantages in the application of Digital Video Broadcasting (DVB), Worldwide Interoperability for Microwave Access (WiMax) and Long Term Evolution (LTE).

What is claimed is:

1. A method of controlling peak to average power ratio (PAPR) of an orthogonal frequency divisional multiplexing (OFDM) signal, comprising:
    with a serial to parallel converter of an OFDM modulator, separating an input OFDM signal into real and imaginary components;
    with the OFDM modulator, scaling the real and imaginary components of the input OFDM signal to produce scaled real and scaled imaginary components of the input OFDM signal;
    with the OFDM modulator, adding an offset term to the scaled real component of the input OFDM signal to produce an adapted real component of the input OFDM signal;
    with the OFDM modulator, phase modulating the adapted real component and the scaled imaginary component to produce a phase modulated OFDM signal including a phase modulated real component and a phase modulated imaginary component; and
    with the OFDM modulator, subtracting a dominant frequency component of the phase modulated OFDM signal from the phase modulated OFDM signal to produce an output signal with a controlled PAPR for transmission;
    wherein:
    the offset term impacts a value of the dominant frequency component.

2. The method of claim 1, wherein the scaled real and scaled imaginary components of the input OFDM signal are represented by the following expressions, respectively:

$$\Phi_1(t) = \frac{\mathfrak{R}(m(t))}{\varsigma};$$

and $$\Phi_2(t) = \frac{\mathfrak{I}(m(t))}{\varsigma}$$

in which ($\Phi_1(t)$) is the scaled real component, ($\Phi_2(t)$) is the scaled imaginary component, $\mathfrak{R}$ and $\mathfrak{I}$ are the real and imaginary components of the input OFDM signal, m(t) is an N-point inverse Fourier transform function, and $\varsigma$ is a constant non-zero division term.

3. The method of claim 1, further comprising, performing an inverse fast fourier transform (IFFT) operation with said OFDM modulator to produce said input OFDM signal.

4. The method of claim 1, further comprising:
    subtracting the phase modulated imaginary component from the phase modulated real component prior to subtracting said dominant frequency component.

5. The method of claim 4, wherein:
    the expression:

$$\cos(2\pi f_c t + \Phi_1(t) + \Psi_{os}) - \cos(2\pi f_c t + \Phi_2(t))$$

represents the addition of said offset term to the scaled real component and the subtraction of the phase modulated imaginary component from the phase modulated real component; and
    wherein $\Phi_1(t)$ and $\Phi_2(t)$ represent the scaled real component and scaled imaginary components, respectively, $\Psi_{os}$ represents said offset term, t is time, and $f_c$ represents the carrier frequency.

6. The method of claim 5, wherein $\Psi_{os}$ is at least twenty two times larger than $\Phi_1(t)$ and $\Phi_2(t)$.

7. The method of claim 5, wherein:

$$\gamma 2 J_0(\beta)^2 \sin\left(2\pi f_c t - \frac{\Psi_{OS}}{2}\right), 0 \leq \gamma < 1$$

represents the dominant frequency component, in which $\gamma$ is a dominant frequency component control factor, $\beta$ is an adapted phase deviation of the real component and imaginary component of the input OFDM signal, and $J_0(\beta)$ is a Bessel function of the first kind of order 0 and argument $\beta$.

8. The method of claim 7, further comprising,
with the OFDM modulator, adjusting $\gamma$ to a value between 0 and 1.0.

9. A method of demodulating an orthogonal frequency-division multiplexing (OFDM) signal, comprising, with an OFDM demodulator:
receiving an input modulated signal;
detecting a peak to average power ratio (PAPR) of the input modulated signal;
determining a predefined dominant frequency component control factor and a constant division term of the input modulated signal at least in part by examining the detected PAPR of the input modulated signal;
adding the predefined dominant frequency component to the input modulated signal to produce an input OFDM modulated signal; and
demodulating the input OFDM modulated input signal.

10. The method of claim 9, further comprising, with said OFDM demodulator:
performing a fast Fourier transform (FFT) on the input OFDM modulated signal.

11. The method of claim 10, further comprising passing the input OFDM modulated signal through an equalizer.

12. The method of claim 9, wherein said OFDM demodulator determines said dominant frequency component control factor at least in part by accessing a lookup table that correlates PAPR to a plurality of predefined dominant frequency component control factor values, ($\gamma$), an offset term ($\Psi_{os}$) and the constant division term ($\zeta$).

13. An Orthogonal Frequency-Division Multiplexing (OFDM) modulator for controlling a peak to average power ratio (PAPR) of an OFDM transmission, comprising:

a multiplier configured to scale imaginary and real components of a transformed OFDM input signal to produce a scaled real component and a scaled imaginary component;
an offset term adder configured to add an offset term to the scaled real component of the transformed OFDM input signal, so as to produce an adapted real component;
a phase modulator configured to phase modulate the adapted real component and the scaled imaginary component of the transformed OFDM input signal using a cosinusoidal to produce a phase modulated OFDM signal including a phase modulated OFDM imaginary component and a phase modulated OFDM adapted real component;
a subtractor configured to subtract the phase modulated OFDM imaginary component from the phase modulated OFDM adapted real component; and
a subtractor configured to subtract a predefined dominant frequency from the phase modulated OFDM signal to produce an output signal with a controlled PAPR for transmission.

14. An Orthogonal Frequency-Division Multiplexing (OFDM) demodulator, comprising:
a Peak-to-Average Power Ratio (PAPR) detector configured to determine a PAPR of an input modulated signal;
a memory comprising a lookup table referencing the PAPR against predefined values for a dominant frequency component control factor ($\gamma$), an offset term ($\Psi_{os}$), and a constant division term ($\zeta$);
a processor configured to determine a predefined dominant frequency component control factor value associated with said input modulated signal from the predefined values in the lookup table;
an adder configured to add the predefined dominant frequency component control factor value to the input modulated signal to produce an input OFDM modulated signal; and
an OFDM demodulator configured to demodulate the input OFDM modulated signal.

* * * * *

UNITED STATES PATENT AND TRADEMARK OFFICE
CERTIFICATE OF CORRECTION

PATENT NO.          : 9,438,455 B2                                Page 1 of 1
APPLICATION NO.     : 13/697442
DATED               : September 6, 2016
INVENTOR(S)         : Dhuness et al.

It is certified that error appears in the above-identified patent and that said Letters Patent is hereby corrected as shown below:

In the Specification

In Column 1, Line 15 of the Cross Reference to Related Application paragraph, delete "method" and insert -- modulated --, therefor.

Signed and Sealed this
Twenty-fifth Day of April, 2017

Michelle K. Lee
*Director of the United States Patent and Trademark Office*